United States Patent [19]

Chen et al.

[11] 4,053,290

[45] Oct. 11, 1977

[54] FIBER BED SEPARATOR

[75] Inventors: Gilbert K. C. Chen, Manchester; Lincoln B. Crosby, St. Louis, both of Mo.

[73] Assignee: Monsanto Company, St. Louis, Mo.

[21] Appl. No.: 733,661

[22] Filed: Oct. 18, 1976

[51] Int. Cl.² .......................................... B01D 19/00
[52] U.S. Cl. .......................................... 55/187; 55/466; 55/488; 55/527; 55/DIG. 25; 210/DIG. 5
[58] Field of Search ........................... 55/97, 185–187, 55/320, 466, 482, 486, 488, 498, 512, 522, 527, DIG. 25; 210/305, DIG. 5

[56] References Cited

U.S. PATENT DOCUMENTS

| | | | |
|---|---|---|---|
| 1,458,657 | 6/1923 | La Rose | 55/498 X |
| 1,771,846 | 7/1930 | Goodloe | 55/DIG. 25 |
| 1,838,512 | 12/1931 | Wilson | 55/187 |
| 3,115,459 | 12/1963 | Giesse | 55/DIG. 25 |
| 3,209,520 | 10/1965 | McKinlay | 55/498 X |
| 3,283,477 | 11/1966 | Kasten | 55/185 X |
| 3,352,778 | 11/1967 | Brink, Jr. et al. | 55/185 X |
| 3,540,190 | 11/1970 | Brink, Jr. | 55/527 X |

FOREIGN PATENT DOCUMENTS

| | | | |
|---|---|---|---|
| 2,510,225 | 10/1975 | Germany | 55/486 |

*Primary Examiner*—Frank A. Spear, Jr.
*Assistant Examiner*—Richard W. Burks
*Attorney, Agent, or Firm*—Arthur E. Hoffman

[57] ABSTRACT

This invention provides vertically disposed fiber bed elements and separators containing the same wherein "bubble re-entrainment" of a collected liquid phase in a gas stream flowing through the fiber bed is substantially eliminated or reduced. "Bubble re-entrainment" refers to that re-entrainment of liquid which occurs at the bottom of the fiber bed where the cumulative drainage of the liquid is at its maximum. This is accomplished by providing at the bottom of the fiber bed a vertically disposed gas flow baffle means such as, e.g., a baffle plate, such that some portion of the fiber bed is disposed downstream of the baffle means and shielded by the lee side of said baffle means from the moving gas stream, said shielding being effective throughout the shielded portion of the fiber bed to reduce the bed velocity of any gas flowing therethrough to below a bubble re-entraining velocity. In a preferred embodiment, the fiber bed is a bicomponent bed of two fiber beds, the first or upstream bed being of at least 5 micron mean diameter fibers, the second or downstream bed being of somewhat coarser fibers than, in intimate contact with, the first bed, and the baffle means being disposed at the interface between the two beds.

28 Claims, 9 Drawing Figures

FIBER BED SEPARATOR

BACKGROUND OF THE INVENTION

This invention relates to an improved fiber bed separator for the separation of liquid particulates (with or without solids dissolved or suspended therein) from gas streams. More particularly, it relates to an improved fiber bed separator whereby bubble re-entrainment of the collected liquid phase from the bottom of a vertically disposed fiber bed is substantially prevented thereby improving the operating characteristics of the fiber bed and allowing extension of the operating ranges of gas bed velocity and/or liquid particulates loading beyond that of prior fiber bed separators.

Fiber bed separators have found widespread use in applications wherein aerosols, particularly of less than 3 microns, must be separated from a gas or vapor (hereinafter and in the claims collectively referred to as "gas") stream. Some of the more frequent applications include removal of acid mists, such as sulfuric acid mist, in acid manufacturing processes, plasticizer mists in, for example, polyvinyl chloride floor or wall covering manufacture, water soluble solid aerosols such as, for example, emissions from ammonium nitrate prill towers. In removal of solid aerosols, the collected solid particulates are dissolved in, or flushed away by, a liquid within the fiber bed through use of an irrigated fiber bed or of a fogging spray of liquid such as water injected into the gas stream prior to the fiber bed.

Re-entrainment of collected liquid from the downstream surface of the fiber bed is often a problem with fiber bed separators and can arise from two mechanisms. As the liquid drains down through the fiber bed and/or the downstream surface thereof, the moving gas stream can cause some of the draining liquid to break or bubble out of the descending liquid stream and become re-entrained in the gas stream as droplets. This problem is particularly severe at the bottom of a vertically disposed fiber bed since all of the liquid collected by the fiber bed necessarily drains to the bottom and from a practical standpoint because of gas phase drag on the liquid, out the downstream surface at the bottom of the fiber bed. At this dis-engagement point where the greatest cumulative drainage occurs, gas phase drag causes bubbling of the draining liquid. As these bubbles break, large to sub-micron sized fragments or droplets are formed which are carried away by the moving gas stream as what is termed "bubble re-entrainment".

The second re-entrainment mechanism termed "bed re-entrainment" occurs at gas bed velocities so high that gas phase drag on the draining liquid in the entire fiber bed causes the liquid to flow in the upper reaches of the fiber bed to the downstream surface thereof with bubbling and fragmentation into re-entrainment. Thus, in a given fiber bed and at a constant liquid loading, as bed velocity increases, a point is reached where bubble re-entrainment begins at the bottom of the fiber bed and as the bed velocity is increased even further bed re-entrainment begins to occur, until with only minor increases in velocity, the bed re-entrainment is occurring from substantially the entire downstream surface of the fiber bed. This invention is directed to the elimination or substantial reduction of bubble re-entrainment. A further advantage of this invention is that with bubble re-entrainment problems solved, the fiber bed elements of this invention can be designed to operate at higher bed velocities up to where bed re-entrainment reaches unacceptable levels.

DESCRIPTION OF THE PRIOR ART

In the past, the re-entrainment problem has been handled in a variety of ways.

A downstream impingement baffle is often used whereby the gas is caused to change its direction of flow by the baffle while re-entrained particles of heavier mass impinges on the baffle surface and drain down. This is adequate for removal of particles of great enough size and mass that their inertia will cause them to strike the baffle rather than continue to flow with the gas around the baffle. It does not effectively remove, however, the smaller particles below about 3 microns in size, which because of their low mass will tend to flow around the baffle with the gas.

A downstream mesh pad or filter is often used, but normally to avoid further significant pressure drop requiring higher power requirements to move the gas, such downstream mesh pad or filter is normally of such large fiber diameter, loose packing density and small bed depth that again only the larger size particles are removed with any high degree of efficiency.

Another solution has been to avoid re-entrainment entirely by designing the fiber bed separators such that the gas velocity through the bed (i.e., the bed velocity) and/or aerosol loading are sufficiently low that the amount of re-entrained particles are held within practical or acceptable limits. This is, in fact, the upper limit of bed velocity and aerosol loading currently used as the design criteria for conventional fiber bed separators. This approach requires larger sizing of the fiber bed separator to provide greater bed surface area in the plane transverse to the direction of gas flow than is needed in the present invention, and results in higher equipment and operating cost per unit volume of gas treated.

In copending application, Ser. No. 642,921, filed Dec. 22, 1975 by Argo, Chen, Kocatas and Ziebold, is described a composite fiber bed separator having a first upstream fiber bed in intimate contact with a second downstream fiber bed, the fibers of the second bed generally being coarser than those of the first bed. This composite fiber bed substantially reduces re-entrainment (as compared to the use of the first fiber bed alone) so as to substantially increase the range of bed velocities at which fiber bed separators can be successfully used, but even with these composite bed separators, there will be reached a bed velocity (with any given bed design and liquid loading in the gas), albeit much greater than otherwise, where bubble re-entrainment will occur to an unacceptable degree. Thus, even with these composite fiber bed separators, the present invention will permit design for operation at even higher bed velocities and/or liquid loadings than otherwise.

SUMMARY OF THE INVENTION

It is an object of this invention to provide a fiber bed separator for removal of liquid particulates from a moving gas stream with little or no bubble re-entrainment at liquid loadings and/or gas bed velocities which otherwise would result in an unacceptable degree of bubble re-entrainment.

With respect to the degree of bubble re-entrainment, "little" refers to acceptable levels of re-entrainment in accordance with the requirements of the given application.

Another object is the provision of a means by which existing fiber bed separator installations experiencing re-entrainment problems can be modified at minimum expense so as to operate at their current gas bed velocity and/or liquid loading in the gas stream, with re-entrainment reduced to an acceptable level.

Another object is the provision of a fiber bed separator, which for any given volume flow rate of gas to be treated and liquid loading thereof can be sized with less fiber bed surface area (and concomitantly greater gas bed velocity) without incurring unacceptable bubble re-entrainment.

These and other objects are obtained by fiber bed separators comprising at least one fiber bed element disposed in a substantially vertical position, each fiber bed element comprising at least a first non-matting bed of randomly distributed fibers having a mean fiber diameter of at least about 5 microns and packed to a substantially uniform bed voidage of about 85 to 98%, and a gas flow baffle means disposed through the entire bottom portion of said fiber bed element intermediate the outer upstream and downstream surfaces defined by said first fiber bed and by any further, optional, fiber bed which may be disposed in intimate contact with the downstream surface of said first fiber bed, such that the resulting portion of fiber bed downstream of said baffle means is shielded from the gas flow at least to the extent that the gas velocity in said portion of fiber bed is reduced to a bed velocity where little or no bubble re-entrainment occurs.

The fiber bed element may be either the conventional cylindrical element of the type shown in FIG. 1 or of the flat bed type shown in FIG. 2.

The gas flow baffle means may be of any design which provides on its leeward side (i.e., the downstream side) a zone of fiber bed around (in the case of cylindrical elements) or across (in the case of flatbed elements) the entire bottom of the fiber bed element so that the liquid within or on the downstream surface of the fiber bed in this zone is sheltered from the gas flow, allowing the liquid draining through or on the downstream surface of this zone to drain freely with little or no bubbles or spray created by gas flow.

Since all liquid collected in the fiber bed of a vertically disposed element drains down through the fiber bed or the downstream surface thereof, the cumulative quantity of liquid draining past any point in the element reaches its maximum at the bottom of the element. This result in a much greater filling of the voidage in the bottom of the fiber bed with liquid than is found in the upper portions of the fiber bed. Gas flow through this zone creates spray and bubles.

Thus, as gas bed velocity is increased, re-entrainment usually begins from the bottom of the fiber bed element, somewhat greater bed velocities being required to cause re-entrainment from the upper portions of the element. Accordingly, shielding of the bottom portion of the downstream end of the fiber bed from the gas flow will prevent bubble formation and breakage on the lee side of the baffle means, with attendant re-entrainment of large and sub-micron particles or fragments, and as a result enable the use of a higher bed velocity or the treatment of gases with a greater liquid loading at the same bed velocity.

When a single fiber bed is used the gas flow baffle means is disposed within the bottom of the fiber bed so that some portion of the fiber bed is downstream of the baffle means. When a bicomponent fiber bed such as those taught in copending application Ser. No. 642,921, filed Dec. 22, 1975 (which is incorporated into and made a part of this specification by reference), the baffle means is advantageously disposed at the interface between the two fiber beds which are otherwise in intimate contact with each other.

The baffle means may be a metal (e.g., such as steel, preferably resistant to attack by the gas or liquid to which the element is exposed) or plastic (e.g., such as glass fiber reinforced polyester) plate extending vertically into the fiber bed from the very bottom thereof.

With the baffle means shielding the zone of the fiber bed downstream thereof from the gas flow, there will frequently be liquid hold-up within this sheltered or leeward zone of the fiber bed. This liquid hold-up can be caused by either or both (a) a plate across the bottom of the fiber bed which is commonly used in fabrication of fiber bed elements, or (b) capillary hold-up particularly when fine fibers (e.g., 5 to 20 micron mean diameter) are used in this zone.

The height of the baffle means will be at least the height of any liquid hold-up (which may or may not be present) in the bottom of the shielded portion of the fiber bed in the lee of the baffle means. More preferably, the baffle means will extend at least 50% higher than this so as to shelter the liquid when it reaches a critically high cumulative drainage volume even above the level of any liquid hold-up where an unacceptable level of bubble re-entrainment would occur at the intended gas bed velocity.

Thus, for fibers of 5 to 20 microns in the fiber bed or in the first bed of a composite fiber bed, heights of at least 1 inch, and preferably at least 1.5 inches, up to 2 to 3 inches are suitable. With fibers of 30 microns or larger in the fiber bed or in the first bed of a composite fiber bed, heights of at least 0.5 to 0.75, and preferably at least 0.75 to 1 inch, up to 1.5 to 2.5 inches are suitable. These figures assume, of course, that there is plate under the fiber bed or beds (or frame with bottom plate and vertical lips in which fiber beds are often mounted) to prevent free drainage from the bottom of the fiber bed and cause other than capillary hold-up. If there is a plate or frame, such as in FIGS. 2 and 3 respectively, under the fiber bed, the baffle means should extend at least as high as the upper level of the liquid being held-up and preferably higher.

In designing fiber bed separators, the principles of this invention can be applied to any substantially vertically disposed fiber bed. For practical considerations the fibers used should be at least 5 micron in mean diameter since beds of finer fibers lack the mechanical stability necessary to stand up to the internal forces within the fiber bed during operation without matting or felting, or shifting so as to result in lower packing density areas permitting channeling of the gas.

Generally, fibers of up to about 20 microns mean diameter (packed to a bed voidage of about 85 to 98%) are employed for high efficiency separation of aerosols, and particularly those under 1 micron in particle size. High velocity separators generally use fibers of about 25 to 200 microns mean diameter (packed to a bed voidage of about 85 to 99%) and are useful when only 1 to 3 micron and larger aerosol particles are of concern.

Typically, high efficiency separators are operated at low bed velocities, i.e., below about 50 feet per minute, to avoid re-entrainment, while high velocity separators are generally operated at bed velocities below about 500 feet per minute for the same reason.

The composite fiber beds taught in copending application Ser. No. 642,921, filed Dec. 20, 1975, wherein two fiber beds in intimate contact with one another are employed; the first, (i.e., upstream) fiber bed being a high efficiency or a high velocity bed as described above, and the second (i.e., downstream) fiber bed being of somewhat coarser fibers than those used in the first bed, have extended the useful bed velocity ranges of fiber bed separators to up to about 100 feet per minute for high efficiency and up to about 700 feet per minute for high velocity separators.

This invention can be used with conventional fiber bed separators, typically a single fiber bed, to eliminate bubble re-entrainment no matter how high a gas bed velocity is used; bed re-entrainment then becoming the limiting factor insofar as how high a bed velocity is used. Advantageously, however, this invention may be used in conjunction with the composite fiber bed element of Ser. No. 642,921, filed Dec. 20, 1975 which can be operated at higher bed velocities than can single bed elements without serious bed re-entrainment. Thus, since bubble re-entrainment is always a more severe problem at any given bed velocity than is bed re-entrainment, elimination or reduction of bubble re-entrainment by practice of this invention allows for operation of any type of fiber bed element at a higher bed velocity than is otherwise possible.

The fibers used should not absorb the liquid to any substantial degree and they, as well as all materials of construction, should be resistant to attack by the gas or the liquid or any component thereof in the intended application. Suitable fiber materials include, for example, metals such as stainless steel, titanium, etc.; fibers of polymeric materials such as polyesters, polyvinylchloride, polyethylene terephthalate, fluorocarbons such as Teflon, nylons, polyalkylenes such as polyethylene and polypropylene, etc., and glass. Glass fibers have found particularly widespread use in fiber bed separators and are preferred. Suitable glass fibers and fiber beds include both coated and uncoated or untreated glass fibers. Glass fibers coated with a material providing lyophobic properties, and particularly the silicone coated hydrophobic glass fibers taught in U.S. Pat. No. 3,107,986 may be used. However, in an especially preferred embodiment uncoated lyophilic, and particularly hydrophylic, glass fibers are used.

Especially useful glass fibers are uncoated long staple glass fibers in diameters up to about 20 microns as the fiber bed in single fiber bed separators, or as the first or upstream fiber bed in bicomponent bed separators, for high efficiency applications; and larger 25 micron or greater curly glass fibers, as such single fiber bed or as such first bed of a bicomponent bed separator, for high velocity applications. Such uncoated glass fibers provide excellent mechanical bed stability at the low packing densities used to obtain the desired bed voidage. If desired, such fiber beds can be heat treated to relieve stresses from packing or forming the bed and to provide additional mechanical stability.

This invention is not limited with respect to how the fiber bed or beds are formed, packed or secured into position in each element.

DESCRIPTION OF THE DRAWINGS

FIGS. 1 through 3 are cross-sectional views of the lower portion of a fiber bed element, either cylindrical or flat bed, illustrating the bubble re-entrainment problem this invention is directed to.

DESCRIPTION OF THE PREFERRED EMBODIMENTS

Figure 1:
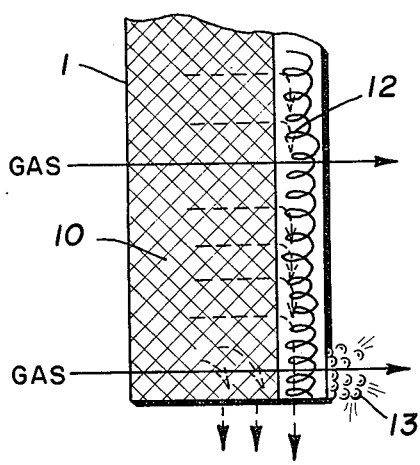
Figure 2:
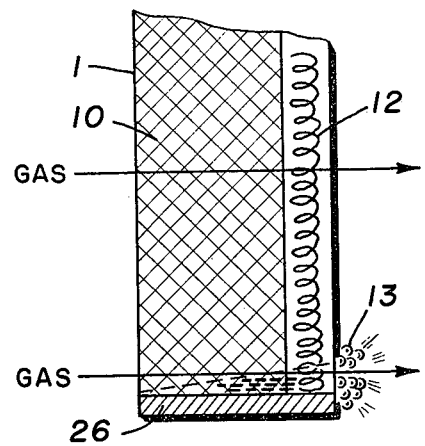
Figure 3:
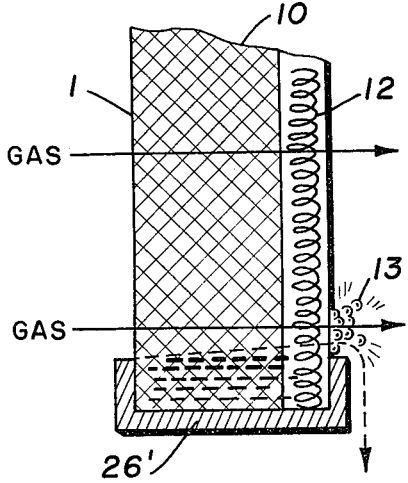

FIGS. 1 to 3 illustrate typical bicomponent fiber bed elements of the prior art and the nature of the bubble re-entrainment problem. For the purposes of this discussion it does not matter whether they are cylindrical or flat bed elements. These Figures show only the lower section of element 1 comprising a first, upstream fiber bed 10 and a second, downstream fiber bed 12.

In FIG. 1, the liquid drainage (represented in this and all of the other Figures by dashed lines) is unrestricted across the bottom of the fiber bed. Cumulative liquid drainage is at its maximum at the very bottom of element 1 where gas phase drag carries at least a large portion (or all at sufficiently high bed velocities) of the liquid to the downstream surface of fiber bed 12 resulting in bubbles 13 which burst under the gas flow with large to sub-micron droplets becoming re-entrained in the gas stream.

FIGS. 2 and 3 show this problem in a typical fiber bed element construction or installation in a separator wherein the problem is further aggravated by liquid which is prevented by bottom plate 26 or frame 26' from freely draining out of the bottom of the fiber bed, in which case all of the cumulative liquid must drain from the downstream face of fiber bed 12 resulting in serious bubble re-entrainment from gas phase drag. In FIGS. 2 and 3 and in the other drawings, the horizontal dash lines at the very bottom of element 1 represent liquid hold-up.

Figure 4:
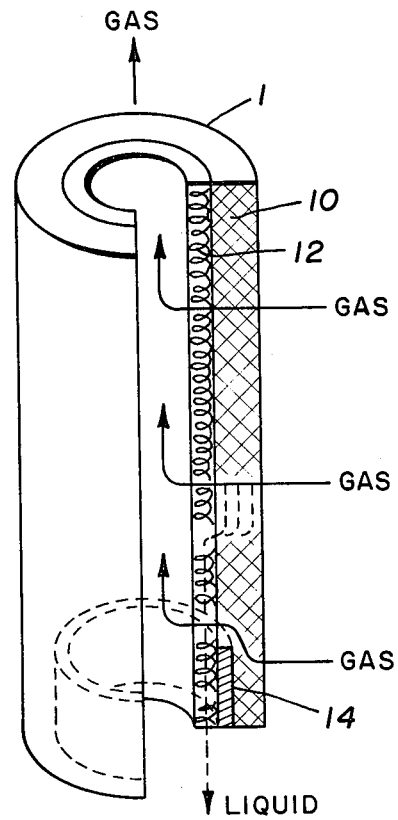
FIG. 4 is a perspective view of a cylindrical bicomponent fiber bed element which comprises one embodiment of this invention.
Figure 5:
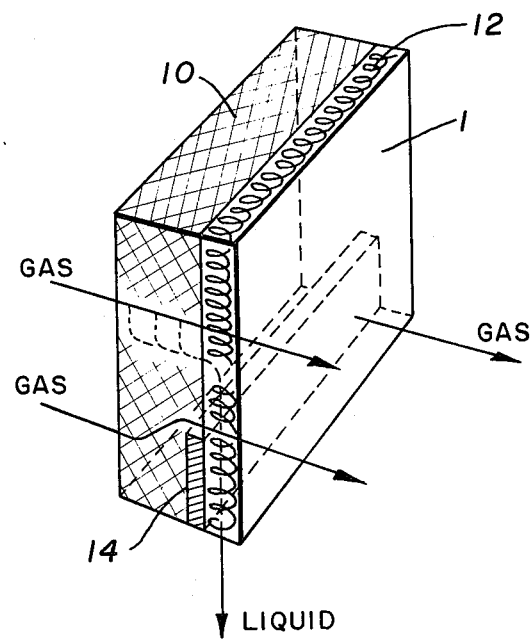
FIG. 5 is a perspective view of a flat bicomponent fiber bed element which comprises another embodiment of this invention.

FIGS. 4 and 5 show two forms of bicomponent fiber bed elements 1 of this invention wherein the above described first or upstream fiber bed 10 is in intimate contact with the second or downstream fiber bed 12. At the bottom of the element at the interface between fiber beds 10 and 12 is a baffle plate 14 which extends entirely around (in the cylindrical element) or across (in the flat bed element) the bottom of the fiber bed.

Figure 6:
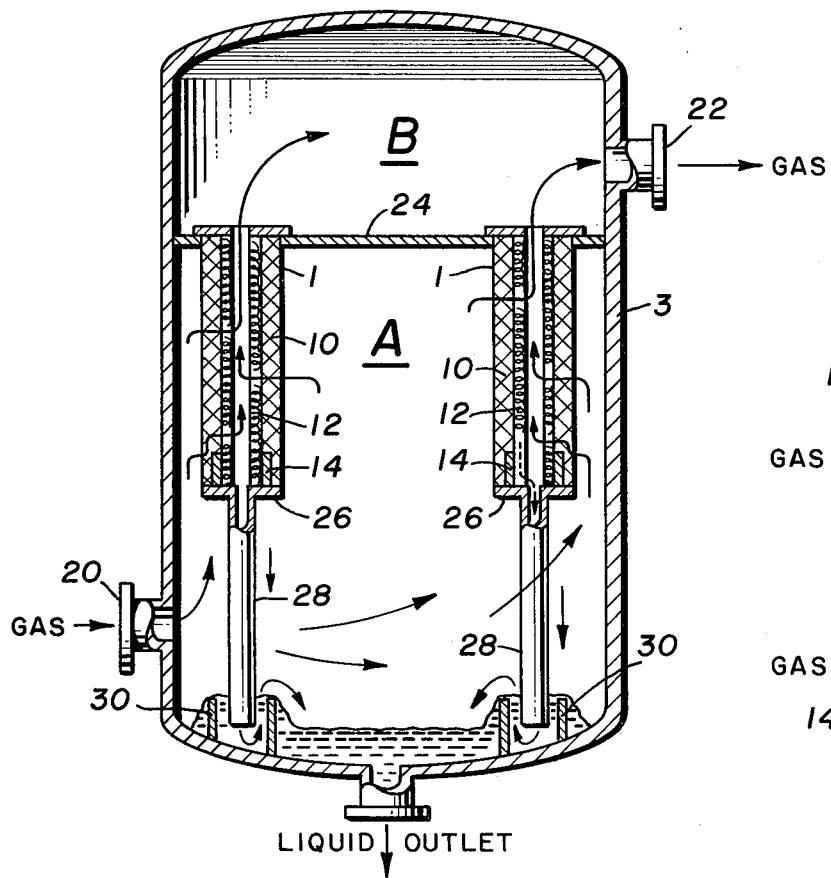
FIG. 6 is a cross-sectional view of one way in which fiber bed elements of this invention may be installed in a fiber bed separator, in this case using the cylindrical bicomponent fiber bed element shown in FIG. 4.

One embodiment of cylindrical elements installed in a typical separator is shown in FIG. 6 wherein a fiber bed separator is shown consisting of a vessel 3 provided with gas inlet and outlet means 20 and 22, respectively, and a plurality of cylindrical elements 1 suspended from tube sheet 24. The opposite end of each element is closed off against gas entering the core thereof from Zone A by plate 26 provided with a liquid drain pipe 28 extending to a suitable sealpot 30 in the bottom of vessel 1. Thus, in operation aerosol-containing gas entering Zone A is required to flow successively through fiber beds 10 and 12 into the cores of elements 1 and thence into Zone B before leaving vessel 1 through outlet 22. Baffle plate 14 provides a shield for the draining liquid on the downstream side thereof, where plate 26 causes some hold-up of the liquid in the bottom of fiber bed 12.

Figure 7:
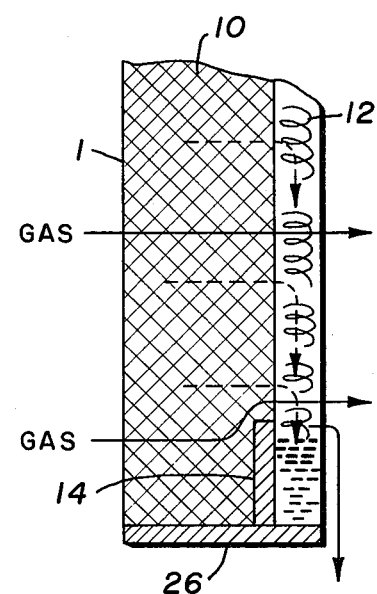
FIGS. 7 through 9 are cross-sectional side views of various embodiments of fiber bed separators of this invention, and are equally applicable to either cylindrical or flat bed elements.
Figure 8:
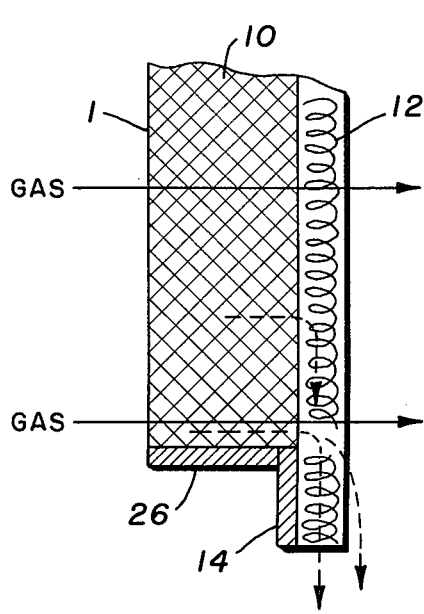
Figure 9:
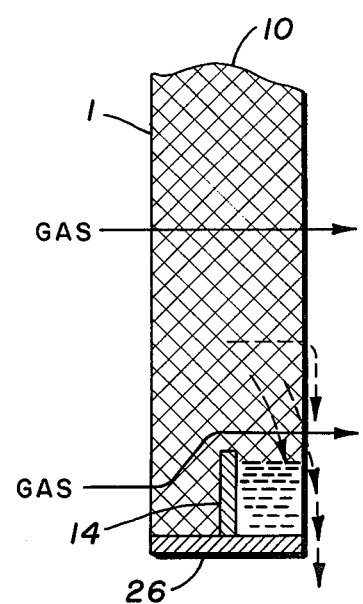

FIGS. 7 through 9 show various embodiments of gas flow baffle means which can be employed in the practice of this invention.

FIG. 7 is a larger scale view of the baffle plate 14 shown in FIGS. 1 and 2. The horizontal dashed lines in fiber bed 12 on the lee side of baffle plate 14 show the level of liquid hold-up in this zone shielded from the gas flow. This liquid hold-up is caused in this instance by plate 26, although if fiber bed 12 is of sufficiently fine fibers, capillary action may also cause some liquid hold-up in this sheltered zone. It should also be noted that baffle plate 14 is close enough to the downstream surface of fiber bed 12 that the main flow or gas is above this sheltered zone without an appreciable amount of gas flowing downwardly into this zone after it passes baffle plate 14 so as to achieve any appreciable bed velocity in this sheltered zone by the time it leaves the downstream surface of fiber bed 12 and cause bubble re-entrainment of liquid draining out of this sheltered zone.

FIG. 8 illustrates another embodiment wherein only fiber bed 12 extends co-extensive with baffle plate 14 and fiber bed 10 extends down only as far as the top of baffle plate 14. This illustrates that extension of fiber bed 10 down past the top of baffle plate 14 is not necessary, although it may be preferred for ease of fabrication.

FIG. 9 illustrates the practice of this invention in a single bed element wherein baffle plate 14 is placed in the bottom of fiber bed 10 with some portion of fiber bed 10 extending on both sides of the baffle plate, although fiber bed 10 need not extend lower than the top of baffle plate 14 on the upstream side thereof; e.g., similarly to FIG. 5.

The following examples illustrate the effectiveness of this invention in reducing re-entrainment.

EXAMPLE I

A bicomponent flat bed element is made with a fiber bed measuring 11 inches wide by 11 inches high and 1 inch thick. The first or upstream fiber bed is 0.75 inch thick and of 30 micron mean diameter uncoated curly glass fibers packed to a density of 7 pounds per cubic foot. The second or downstream fiber bed (in intimate contact over the entire surface area with the first bed) is 0.25 inch thick and of 200 micron mean diameter uncoated glass fibers packed to a voidage of 85 to 99%.

A pan measuring 10 inches by 10 inches is placed at the bottom of the element downstream of the fiber bed with its closest edge approximately 1 inch from the fiber bed so as to collect any heavy liquid droplets leaving the fiber bed in the air stream.

With an air stream flowing through the fiber bed at a bed velocity of about 400 feet per minute, a fine water mist is sprayed over the upstream surface of the fiber bed at a rate of about 0.5 gallons per minute. Water droplets are observed coming from the bottom of the fiber bed and are collected in the pan at the rate of about 365 milliliters per minute.

EXAMPLE II

Using the same flat bed element as in Example I, but with a 1.5 inch high baffle plate across the entire bottom of the element at the interface between the first and second fiber beds as shown in FIG. 2, and operating at the same air bed velocity and water spray rate, no water droplets are observed coming from the flat bed element. After several minutes operation, there is no liquid in the pan.

The foregoing description of the several embodiments of this invention is not intended as limiting of the invention. As will be apparent to those skilled in the art the inventive concept set forth herein can find many applications in the art of fiber bed separations and many variations on and modifications to the embodiments described above may be made without departure from the spirit and scope of this invention.

What is claimed is:

1. In a fiber bed separator for separation of liquid particulates from a moving gas stream comprising at least one fiber bed element disposed in a substantially vertical position wherein the collected liquid phase drains to the bottom of the fiber bed element, the improvement whereby bubble re-entrainment of the collected liquid phase from the bottom downstream surface of the fiber bed may be substantially reduced or eliminated, which comprises a gas flow baffle means disposed through the entire bottom portion of each fiber bed element intermediate the upstream and downstream surfaces of the fiber bed, said gas flow baffle means extending substantially vertically from the bottom of that portion of said fiber bed which is on the downstream side of said baffle means to a height such that said downstream portion of fiber bed in the lee side of said baffle means is sufficiently shielded from gas flow that the bed velocity of any gas flowing through said shielded portion of the fiber bed is below bubble re-entrainment velocity.

2. A fiber bed separator as in claim 1 wherein each fiber bed is a single non-matting bed of fibers of from 5 to 200 microns mean diameter substantially uniformly packed to a void fraction of 85 to 99%.

3. A fiber bed separator as in claim 1 wherein each fiber bed element is a cylindrical element having an open core.

4. A fiber bed separator as in claim 1 wherein each fiber bed element is a flat bed.

5. A fiber bed separator as in claim 2 wherein the fibers are glass fibers.

6. A fiber bed separator as in claim 5 wherein the glass fibers are long staple glass fibers of from 5 to 20 microns mean diameter.

7. A fiber bed separator as in claim 5 wherein the glass fibers are curly glass fibers of from 25 to 200 microns mean diameter.

8. A fiber bed separator as in claim 1 wherein each fiber bed is comprised of a first fiber bed and a second fiber bed of fibers coarser than in said first fiber bed, said second fiber bed being in intimate contact with said first fiber bed across substantially the entire downstream surface of said first fiber bed, and said gas flow barrier means being disposed at the upstream surface of said second fiber bed.

9. A fiber bed separator as in claim 8 wherein said first fiber bed is a non-matting bed of fibers of from 5 to 200 microns mean diameter substantially uniformly packed to a void fraction of 85 to 99%.

10. A fiber bed separator as in claim 8 wherein each fiber bed element is a cylindrical element having an open core.

11. A fiber bed separator as in claim 8 wherein each fiber bed element is a flat bed.

12. A fiber bed separator as in claim 9 wherein the fibers are glass fibers.

13. A fiber bed separator as in claim 12 wherein the glass fibers are long staple glass fibers of from 5 to 20 microns mean diameter.

14. A fiber bed separator as in claim 12 wherein the glass fibers are curly glass fibers of from 25 to 200 microns mean diameter.

15. In a fiber bed element for use in a substantially vertical position to separate liquid particulates from a moving gas stream with a collected liquid phase draining to the bottom of said fiber bed element, the improvement whereby bubble re-entrainment of the collected liquid phase from the bottom downstream surface of the fiber bed may be substantially reduced or eliminated which comprises a gas flow baffle means disposed through the entire bottom portion of each fiber bed element intermediate the upstream and downstream surfaces of the fiber bed, said gas flow baffle means extending substantially vertically from the bottom of that portion of said fiber bed which is on the downstream side of said baffle means to a height such that said downstream portion of fiber bed in the lee side of said baffle means is sufficiently shielded from gas flow that the bed velocity of any gas flowing through said shielded portion of the fiber bed is below bubble re-entrainment velocity.

16. A fiber bed element as in claim 15 wherein each fiber bed is a single non-matting bed of fibers of from 5 to 200 microns mean diameter substantially uniformly packed to a void fraction of 85 to 99%.

17. A fiber bed element as in claim 15 wherein each fiber bed element is a cylindrical element having an open core.

18. A fiber bed element as in claim 15 wherein each fiber bed element is a flat bed.

19. A fiber bed element as in claim 16 wherein the fibers are glass fibers.

20. A fiber bed element as in claim 19 wherein the glass fibers are long staple glass fibers of from 5 to 20 microns mean diameter.

21. A fiber bed element as in claim 19 wherein the glass fibers are curly glass fibers of from 25 to 200 microns mean diameter.

22. A fiber bed element as in claim 15 wherein each fiber bed is comprised of a first fiber bed and a second fiber bed of fibers coarser than in said first fiber bed, said second fiber bed being in intimate contact with said first fiber bed across substantially the entire downstream surface of said first fiber bed, and said gas flow barrier means being disposed at the upstream surface of said second fiber bed.

23. A fiber bed element as in claim 22 wherein said first fiber bed is a non-matting bed of fibers of from 5 to 200 microns means diameter substantially uniformly packed to a void fraction of 85 to 99%.

24. A fiber bed element as in claim 22 wherein each fiber bed element is a cylindrical element having an open core.

25. A fiber bed element as in claim 22 wherein each fiber bed element is a flat bed.

26. A fiber bed element as in claim 23 wherein the fibers are glass fibers.

27. A fiber bed element as in claim 26 wherein the glass fibers are long staple glass fibers of from 5 to 20 microns mean diameter.

28. A fiber bed element as in claim 26 wherein the glass fibers are curly glass fibers from 25 to 200 microns mean diameter.

* * * * *